United States Patent Office 2,789,102
Patented Apr. 16, 1957

2,789,102
RUBBER COMPOSITIONS

Elliott L. Weinberg, Long Island City, N. Y., assignor to Metal & Thermit Corporation, New York, N. Y., a corporation of New Jersey No Drawing. Application June 2, 1953,
Serial No. 359,199

20 Claims. (Cl. 260—45.75)

The present invention relates to the stabilization of elastomers against degradation brought about by aging, and especially of rubber compounds of the class consisting of natural rubber and rubbery synthetic polymers. Such properties of the elastomers as elongation, tensile strength, modulus, tackiness, surface crackings, etc., are adversely affected in the absence of a stabilizer normally termed rubber anti-oxidants.

It has been found that an organotin derivative of a non-heterocyclic mercapto-acid derivative, containing the group

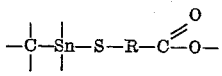

in which R is a hydrocarbon group, is an effective anti-oxidant for natural and synthetic rubbers.

Organotin compounds of the general type $$R_nSn[SR'(COOR'')_x]_{4-n}$$

wherein $n=1$, 2 or 3, and $x=1$ or 2, are particularly effective anti-oxidants for natural and synthetic rubbers. In the generalized structural formula for these organotin anti-oxidants, R is a univalent organic radical, such as alkyl, aralkyl, or aryl connected directly to tin, R' is an aliphatic or aromatic hydrocarbon radical of valence $x+1$, one bond of which is connected to sulfur and another to the carbon of a carboxyl group, and R'' represents hydrogen or a univalent organic radical, such as alkyl, aralkyl or aryl. In these compounds, the organotin radical containing the C—Sn group is bonded to the sulfur radical by the Sn—S bonds.

Where $x=1$, in the above general type formula, there is obtained an organotin compound having the more specific formula $$R_nSn(SR'COOR'')_{4-n}$$

These compounds may be prepared in any suitable manner. For example, they may be prepared in high yield and purity by reacting an organotin compound with mercapto-acids and mercapto-acid esters, and recovering a reaction product having the desired Sn—S linkage and ratio. More specifically, an organotin compound selected from the group consisting of organotin hydroxide, oxide and stannoic acid may be condensed with an appropriate amount of a mercapto acid or mercapto acid ester to produce products having the above structural formulas. An organotin halide having the formula $RSnX_3$, $R_2SnX_2$, or $R_3SnX$, wherein X is a halide, such as chlorine, may also be employed as the reactant with the mercapto-acids or esters. However, for optimum results, it is preferable to condense these reactants in the presence of basic substances or alkaline neutralizing agents (hydrogen ion acceptors) such as oxides, hydroxides (e. g. sodium hydroxide), carbonates (e. g. sodium and potassium carbonate) and tertiary amines (e. g. pyridine) etc. The reaction for the formation of the bismercapto derivatives using organotin oxide is illustrated by the following equation:

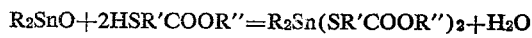

Similarly, products of the formula $RSn(SR'COOR'')_3$ may be produced from stannoic acid in accordance with the following reaction:

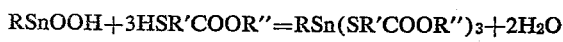

Products of the formula $R_3SnSR'COOR''$ may be produced from organotin chloride in accordance with the following reaction:

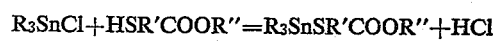

The organotin derivatives described above are extremely effective rubber anti-oxidants, as demonstrated by their stabilizing ability at exceptionally low concentrations. Whereas many anti-oxidants require a concentration above 2% to be effective, the organotin derivatives described are effective at less than the 0.1% concentration level. These derivatives would normally be used at the 0.1% level based on the weight of rubber, but 0.05% to 5% may be used.

The organotin derivatives described do not cause discoloration of rubber stocks, as does, for example, the anti-oxidant phenyl beta-naphthylamine commonly employed. This property of the organotin derivative described permits the manufacture of white stocks which do not discolor.

The organotin derivatives described can be effectively used as anti-oxidants with elastomers and more specifically with rubbery materials of the class consisting of (a) natural rubber, (b) rubber-like copolymers of 1,3 butadiene and styrene (GR–S type), (c) rubber-like copolymers of 1,3 butadiene and acrylonitrile (nitrile type) and (d) rubber-like homopolymers of chloroprene (neoprene type).

Specific examples of organotin derivatives of the general type described which can be effectively employed as anti-oxidants for the purpose of the present invention consist of the following compounds:

Dimethyltin S,S' bis (octadecyl β-mercaptopropionate)
Dimethyltin S,S' bis (p-cresyl mercaptoacetate)
Ethyltin S,S',S'' tris (isooctyl mercaptoacetate)
Triethyltin S (isooctyl mercaptoacetate)
Butyltin S,S',S'' tris (benzyl β-mercaptopropionate)
Dibutyltin S,S' bis (isooctyl mercaptoacetate)
Dibutyltin S,S' bis (3,5,5 trimethylhexyl mercaptoacetate)
Dibutyltin S,S' bis (octadecyl mercaptoacetate)
Dibutyltin S,S' bis (butyl β-mercaptopropionate)
Dibutyltin S,S' bis (di-2-ethylhexyl thiomalate)
Di-n-butyltin S,S' bis (methyl thiosalicylate)
Tributyltin S (isooctyl β-mercaptopropionate)
Di-n-amyltin S,S' bis (didecyl thiomalate)
Dilauryltin S,S' bis (butyl mercaptoacetate)
Ethylphenyltin S,S' bis (isooctyl mercaptoacetate)
Diphenyltin S,S' bis (lauryl mercaptoacetate)
Triphenyltin S (dibutyl thiomalate)
Dibenzyltin S,S' bis (isooctyl β-mercaptopropionate)
Di-o-tolyltin S,S' bis (dibutyl thiomalate)
Dicyclohexyltin S,S' bis (3,5,5 trimethylhexyl mercaptoacetate)

The organotin mercapto-acid derivative may be milled into the rubbery material defined above, without other additions, for the purpose of preventing degradation during storage. More commonly they will be incorporated with other materials during compounding.

Any suitable compounding formulation may be employed. A specific example of a natural rubber composition, in which the organotin derivative described is effective as an anti-oxidant is as follows:

| | Parts by weight |
|---|---|
| Thin, pale crepe | 100.0 |
| Zinc oxide (lead-free) | 5.0 |
| Stearic acid | 1.0 |
| Titanium dioxide (anatase) | 10.0 |
| Insoluble sulfur | 3.0 |
| Benzothiazyl disulfide | 1.0 |
| Tetramethylthiuram disulfide | 0.1 |

To this composition may be added any of the organotin derivatives set forth in the specific examples above, in the proportions of 0.05% to 5% by weight, based on the weight of the rubber ingredient of said composition and preferably in the approximate 0.1% level. This compounded rubber composition containing the stabilizer is worked and blended by conventional techniques and vulcanized at 275° F. for twenty minutes in an hydraulic press.

The effectiveness of the organotin derivative described as an anti-oxidant is indicated by the following test results carried out with the specific rubber composition described above containing anti-oxidant in the amounts and manner shown below, to form four specific examples as follows, and after being vulcanized in the manner described:

Example 1. No anti-oxidant.
Example 2. ⅛ pt. of dibutyl tin S,S' bis (isooctyl mercaptoacetate).
Example 3. 1 pt. of dibutyl tin S,S' bis (isooctyl mercaptoacetate).
Example 4. 1 pt. commercial anti-oxidant A.

The test methods employed to determine the anti-oxidant properties consisted of (1) outdoor exposure and (2) the Oxygen Bomb Test—ASTM Procedure D-572-48. The outdoor exposure test samples were examined for tackiness, surface checking and discoloration. The oxygen bomb test samples were examined for changes in tensile strength, elongation and modulus with standard equipment.

The results of the tests on the examples described above were as follows:

*Outdoor exposure—60 days*

| Sample | Color | Tackiness | Surface Checking |
|---|---|---|---|
| Ex. 1 | No discoloration | Pronounced | Pronounced. |
| Ex. 2 | do | None | Very slight. |
| Ex. 3 | do | do | Do. |
| Ex. 4 | Discolored | Slight | Pronounced. |

*Oxygen bomb test—4 days @ 70° C.*

| | Modulus (p. s. i.) 200% Elongation | | (p. s. i.) Tensile Strength | | Percent Elongation | |
|---|---|---|---|---|---|---|
| Sample | Orig. | Aged | Orig. | Aged | Orig. | Aged |
| Ex. 1 | 270 | 270 | 2,980 | 1,300 | 600 | 500 |
| Ex. 2 | 295 | 315 | 3,030 | 2,300 | 610 | 550 |
| Ex. 3 | 235 | 305 | 2,075 | 2,000 | 655 | 520 |
| Ex. 4 | 250 | 315 | 3,210 | 2,400 | 645 | 525 |

Similar tests on GR-S rubber (1,3 butadiene-styrene) indicate that the stabilization of synthetic rubber with organotin derivatives of the general type described, is just as pronounced as it is in the case of natural rubber. Although the examples show the stabilizer used with natural rubber crepe and with coagulated GR-S (1,3 butadiene and styrene), incorporation of the stabilizer into latices is possible. The latices would then be processed in the usual manner.

The rubber composition to be stabilized may contain quantities of pigments to impart any desired color or decorative effect to the final product. The stabilizer will cause the rubber composition to maintain its color whether it is black, white or any other color.

While the invention has been described with reference to various examples and embodiments, it will be apparent to those skilled in the art that various modifications may be made, and equivalents substituted therefor, without departing from the principles and true nature of the invention.

What is claimed is:

1. A rubber composition comprising as a basic ingredient a rubbery polymer selected from the class consisting of natural rubber, copolymers of 1,3 butadiene and styrene and copolymers of 1,3 butadiene and acrylonitrile and containing a stabilizing amount of an organotin compound of the type formula $$R_nSn[SR'(COOR'')_x]_{4-n}$$

wherein $n$ is an integer from 1 to 3, $x$ is an integer from 1 to 2, R is a univalent organic radical of the class consisting of alkyl, aralkyl and aryl connected directly to tin, R' is a radical having a valence of $x+1$ and is selected from the class consisting of aliphatic hydrocarbon and aromatic hydrocarbon, one bond of which is connected to sulfur and another to carbon of a carboxyl group, and R'' is selected from the class consisting of hydrogen, alkyl, aralkyl and aryl radicals.

2. A rubber composition according to claim 1 wherein the stabilizer is present in the amount of 0.05% to 5% by weight of rubber ingredient.

3. A rubber composition according to claim 2 wherein the stabilizer is present in the amount of about 0.1% by weight of rubber ingredient.

4. A rubber composition according to claim 2 wherein the composition is cured.

5. A method of treating a rubber composition comprising as a basic ingredient a rubbery polymer selected from the class consisting of natural rubber, copolymers of 1,3 butadiene and styrene and copolymers of 1,3 butadiene and acrylonitrile which comprises curing said rubber composition in the presence of a stabilizing amount of an organotin compound of the type formula $$R_nSn[SR'(COOR'')_x]_{4-n}$$

wherein $n$ is an integer from 1 to 3, $x$ is an integer from 1 to 2, R is a univalent organic radical of the class consisting of alkyl, aralkyl and aryl radicals connected directly to tin, R' is a radical having a valence of $x+1$ and is selected from the class consisting of aliphatic hydrocarbon and aromatic hydrocarbon, one bond of which is connected to sulfur and another to the carbon of a carboxyl group, and R'' is selected from the class consisting of hydrogen, alkyl, aralkyl and aryl radicals.

6. A method of treating a rubber composition according to claim 5 wherein the stabilizer is present in the amount of 0.05% to 5% by weight of rubber ingredient.

7. A rubber composition according to claim 1, wherein X is 1, $n$ is 2, R is alkyl, R' is aliphatic hydrocarbon, R'' is alkyl and the rubbery polymer is a copolymer of 1,3 butadiene and styrene.

8. A rubber composition according to claim 1, wherein X is 1, $n$ is 3, R is alkyl, R' is aliphatic hydrocarbon, R'' is alkyl and the rubbery polymer is a copolymer of 1,3 butadiene and styrene.

9. A rubber composition according to claim 1, wherein X is 2, $n$ is 2, R is alkyl, R' is aliphatic hydrocarbon, R'' is alkyl and the rubbery polymer is a copolymer of 1,3 butadiene and styrene.

10. A rubber composition according to claim 1, wherein X is 1, $n$ is 2, R is aryl, R' is aliphatic hydrocarbon, R'' is alkyl, and the rubbery polymer is a copolymer of 1,3 butadiene and styrene.

11. A rubber composition according to claim 1, wherein X is 1, n is 1, R is alkyl, R' is aliphatic hydrocarbon, R" is alkyl and the rubbery polymer is a copolymer of 1,3 butadiene and styrene.

12. A rubber composition according to claim 7, wherein the organotin stabilizer is dibutyltin S,S' bis (isooctyl mercaptoacetate).

13. A rubber composition according to claim 12, wherein the dibutyltin S,S' bis(isooctyl mercaptoacetate) is present in the amount of about 0.05% to 5% by weight of rubber ingredient.

14. A method according to claim 5, wherein X is 1, n is 2, R is alkyl, R' is aliphatic hydrocarbon, R" is alkyl and the rubbery polymer is a copolymer of 1,3 butadiene and styrene.

15. A method according to claim 5, wherein X is 1, n is 3, R is alkyl, R' is aliphatic hydrocarbon and R" is alkyl and the rubbery polymer is a copolymer of 1,3 butadiene and styrene.

16. A method according to claim 5, wherein X is 2, n is 2, R is alkyl, R' is aliphatic hydrocarbon, R" is alkyl and the rubbery polymer is a copolymer of 1,3 butadiene and styrene.

17. A method according to claim 5, wherein X is 1, n is 2, R is aryl, R' is aliphatic hydrocarbon and R" is alkyl and the rubbery polymer is a copolymer of 1,3 butadiene and styrene.

18. A method according to claim 5, wherein X is 1, n is 1, R is alkyl, R' is aliphatic hydrocarbon, R" is alkyl and the rubbery polymer is a copolymer of 1,3 butadiene and styrene.

19. A method according to claim 5, wherein the organotin compound employed is dibutyltin S,S' bis (isooctyl mercaptoacetate), and the rubbery polymer is a copolymer of 1,3 butadiene and styrene.

20. A method according to claim 19, wherein the dibutyltin S,S' bis (isooctyl mercaptoacetate) is used in the amount of about 0.05 to 5% by weight rubber ingredient.

References Cited in the file of this patent

UNITED STATES PATENTS

| | | |
|---|---|---|
| 2,592,926 | Mack et al. | Apr. 15, 1952 |
| 2,641,596 | Leistner et al. | June 9, 1953 |
| 2,713,585 | Best | July 19, 1955 |